(12) United States Patent
Pineda de Gyvez et al.

(10) Patent No.: US 10,732,698 B2
(45) Date of Patent: Aug. 4, 2020

(54) EVENT-BASED POWER MANAGER

(71) Applicant: NXP B.V., Eindhoven (NL)

(72) Inventors: Jose de Jesus Pineda de Gyvez, Eindhoven (NL); Hamed Fatemi, Eindhoven (NL); Manuele Rusci, Siena (IT); Luca Benini, Ferrara (IT); Elisabetta Farella, Bologna (IT); Davide Rossi, Bologna (IT)

(73) Assignee: NXP B.V., San Jose, CA (US)

(*) Notice: Subject to any disclaimer, the term of this patent is extended or adjusted under 35 U.S.C. 154(b) by 188 days.

(21) Appl. No.: 15/813,861

(22) Filed: Nov. 15, 2017

(65) Prior Publication Data
US 2019/0146566 A1    May 16, 2019

(51) Int. Cl.
*G06F 1/32* (2019.01)
*G06F 1/324* (2019.01)
*G06F 11/34* (2006.01)
*G06F 9/48* (2006.01)
*G06F 1/3228* (2019.01)
*G06F 1/329* (2019.01)
*G06F 1/3234* (2019.01)

(52) U.S. Cl.
CPC ............... *G06F 1/324* (2013.01); *G06F 1/329* (2013.01); *G06F 1/3228* (2013.01); *G06F 1/3243* (2013.01); *G06F 9/485* (2013.01); *G06F 11/3414* (2013.01)

(58) Field of Classification Search
None
See application file for complete search history.

(56) References Cited

U.S. PATENT DOCUMENTS

| 8,995,249 B1* | 3/2015 | Roy | H04L 41/147 370/216 |
| 9,037,152 B1* | 5/2015 | Herrera | H04W 64/00 455/456.1 |
| 2010/0332876 A1* | 12/2010 | Fields, Jr. | G06F 1/3203 713/323 |
| 2012/0102503 A1* | 4/2012 | Meijer | G06F 9/5094 719/318 |

(Continued)

OTHER PUBLICATIONS

Bambagini, M. and Marinoni, M., "Energy-Aware Scheduling for Real-Time Systems: A Survey," ACM Transactions on Embedded Computing Systems, vol. 15, No. 1, Article 7, Jan. 2016, 34 pages.

(Continued)

*Primary Examiner* — Danny Chan

(57) ABSTRACT

A technique for managing power in an embedded processing system includes generating a workload model for the embedded processing system in response to a control signal, an event status signal, and a reference clock signal. The control signal is received from a peripheral device. The event status signal is received from an event processor configured to control execution of tasks by a processor core of the embedded processing system. The technique includes providing power configuration information to the processor core. The power configuration information corresponds to an operating point selected based on the control signal, the event status signal, the reference clock signal, the workload model, and a predetermined energy model.

20 Claims, 5 Drawing Sheets

(56) References Cited

U.S. PATENT DOCUMENTS

| | | | |
|---|---|---|---|
| 2015/0046685 A1* | 2/2015 | Park | G06F 1/3243 |
| | | | 712/220 |
| 2015/0095009 A1* | 4/2015 | Brock | G06F 17/5009 |
| | | | 703/21 |
| 2016/0239074 A1* | 8/2016 | Lee | G06F 1/3225 |
| 2019/0004917 A1* | 1/2019 | Gao | G06F 11/3062 |

OTHER PUBLICATIONS

Brodowski, D., et al. "CPU frequency and voltage scaling code in the Linux(TM) kernel," https://www.kernel.org/doc/Documentation/cpu-freq/governors.txt, Apr. 12, 2017, 5 pages.

Dhiman, G. and Rosing, T., "System-Level Power Management Using Online Learning," IEEE Transactions on Computer-Aided Design of Integrated Circuits and Systems, vol. 28, No. 5, May 2009, pp. 676-689.

Pillai, P. and Shin, K., "Real-Time Dynamic Voltage Scaling for Low-Power Embedded Operating Systems," ACM SIGOPS Operating Systems Review, vol. 35, No. 5, 2001, 14 pages.

Själander, M., et al., "Power-Efficient Computer Architectures: Recent Advances," Synthesis Lectures on Compute Architecture 9.3, 2014, 92 pages.

ARM Limited, "ARMv6-M Architecture Reference Manual," Section B3.4, May 19, 2017, pp. B3-243 to B3-250.

\* cited by examiner

EVENT-BASED POWER MANAGER

BACKGROUND

Field of the Invention

The invention is related to processing systems and more particularly to power management in embedded processing systems.

Description of the Related Art

In conventional processing systems, software modules of an operating system implement power management policies. The operating system requests voltage and frequency adjustments to the underlying hardware. For example, the LINUX® operating system includes CPUFreq Governor modules that configure a target frequency of a clock signal according to an actual workload. The OnDemand Governor quantifies the workload by periodically sampling processor activity and computing the percentage of active time in a time interval. The governor selects a target frequency of the clock signal for a next interval that limits the processor idle time. The governor estimates activity of the processor in the next time interval to be comparable to the activity of the processor in the current time interval. An Interactive Governor achieves faster application responses by decreasing the processor frequency (e.g., based on a workload measurement from a last frequency adjustment) as soon as the processor comes out of the idle state, and boosts the processor frequency again if the application is still running after few system clocks.

In general, embedded processing systems that have constrained resources and application requirements use power management to achieve performance specifications. Software-based dynamic voltage and frequency scaling (DVFS) managers reduce processor power consumption within real-time systems. For each executing task, exemplary DVFS managers assigns a suitable frequency that does not incur performance degradation. The task manager itself, which is part of the operating system stack, selects a target frequency based on workload information provided by the user, i.e. the period of the task, its deadline, and the worst-case execution time. Some systems combine frequency selection with task scheduling management. Typical DVFS algorithms exploit slack between the worst-case execution time and the actual execution time to solve the task scheduling and frequency optimization problems. Other algorithms propose to estimate the execution time of the subsequent task from the measurement of the last job occurrence.

However, embedded processors feature a broad range of operating points, which can be either discrete or continuous, and integrate specialized hardware blocks for dynamically scaling the power supply voltage and clock frequency of the processor on demand. When supported, the operating system configures the actual operating point of the embedded processor using dedicated drivers. However, the programming model of embedded processors may not include additional software modules (e.g. operating system or middleware) for hardware resource management. Thus, the user must explicitly define the power management strategy at design-time.

Conventional power management techniques implemented in real-time embedded systems are tightly coupled with task manager software modules to efficiently handle inter-task power management policies. Software-based algorithm implementations of DVFS and distributed power management strategies rely on workload information coming from the underlying software stack (i.e. operating system or middleware). The programmer-user needs to explicitly declare and specify the workload features, e.g., worst-case execution time, actual execution time, task deadline and task period, if any. This increases system overhead in terms of programming effort and may not be a viable solution in the absence of an operating system containing a task manager module.

Conventional task-agnostic power management techniques are based on time-sliced control, i.e., the power management technique samples processor activity at a fixed periodic rate and changes the target frequency of a processor clock signal accordingly, e.g., OnDemand Governor or other LINUX® Governors modules. These software modules operate independently from task management operation. Efficiency of the time-sliced power management approach depends on the selected sampling interval rate, which is uncorrelated from the workload timing and is defined by the programmer-user. If a single periodic task is running and the sampling interval window has the same length as the task period, then the time-sliced power management policy may implement the optimum policy. Longer sampling intervals will cause the time-sliced power management policy to be less reactive to workload variations and, therefore, less efficient, and may degrade system performance. Intervals shorter than the task period can cause inconsistent processor workload measurements, which eventually result in a less than optimal frequency selection for the clock signal and may degrade system performance.

Other power management approaches advocate workload prediction based on overall processor statistics, which could be inaccurate because of insufficient resource data. Eventually, such simplified models can cause under-predictions or over-predictions, which are risky when processing latency-critical tasks. Time-sliced power management policies attempt to minimize a predicted idle period during a next time interval by selecting the lowest frequency which does not incur performance degradation. However, the underlying assumption, which considers the most energy-efficient active state as the one with the lowest frequency clock signal, may not be true. Static power of the core and fixed system power (due to additional logic, e.g. PLL) can be substantial contributors to the total power budget (e.g. the leakage current is increasing when operating in sub-threshold voltage) with respect to the dynamic power of the core, which decreases at low-frequency operation. Thus, time-sliced power management may select an operating point that degrades system performance.

Accordingly, improved power management techniques for embedded processing systems are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

An event-based power manager implements adaptive and dynamic power management in embedded processing systems. The event-based power manager may increase energy-efficiency of low-power electronic devices by exploiting well-known techniques, such as dynamic voltage and frequency scaling, dynamic power management, and power mode control. Unlike other solutions, the event-based power manager is reactive to an executing workload of the embedded processor and does not rely on any predetermined workload information provided by a programmer-user. The event-based power manager adjusts performance of the embedded processing system to reduce energy consumption without causing performance degradation. The event-based power manager is independent of any software-based task manager module that may be included in software-middleware or an operating system. The event-based power manager may be incorporated into Internet of Things (IoT) devices, for sensor-based applications, e.g., wearable health monitoring devices, voice recognition, image and video labelling, and environmental monitoring.

Figure 1:
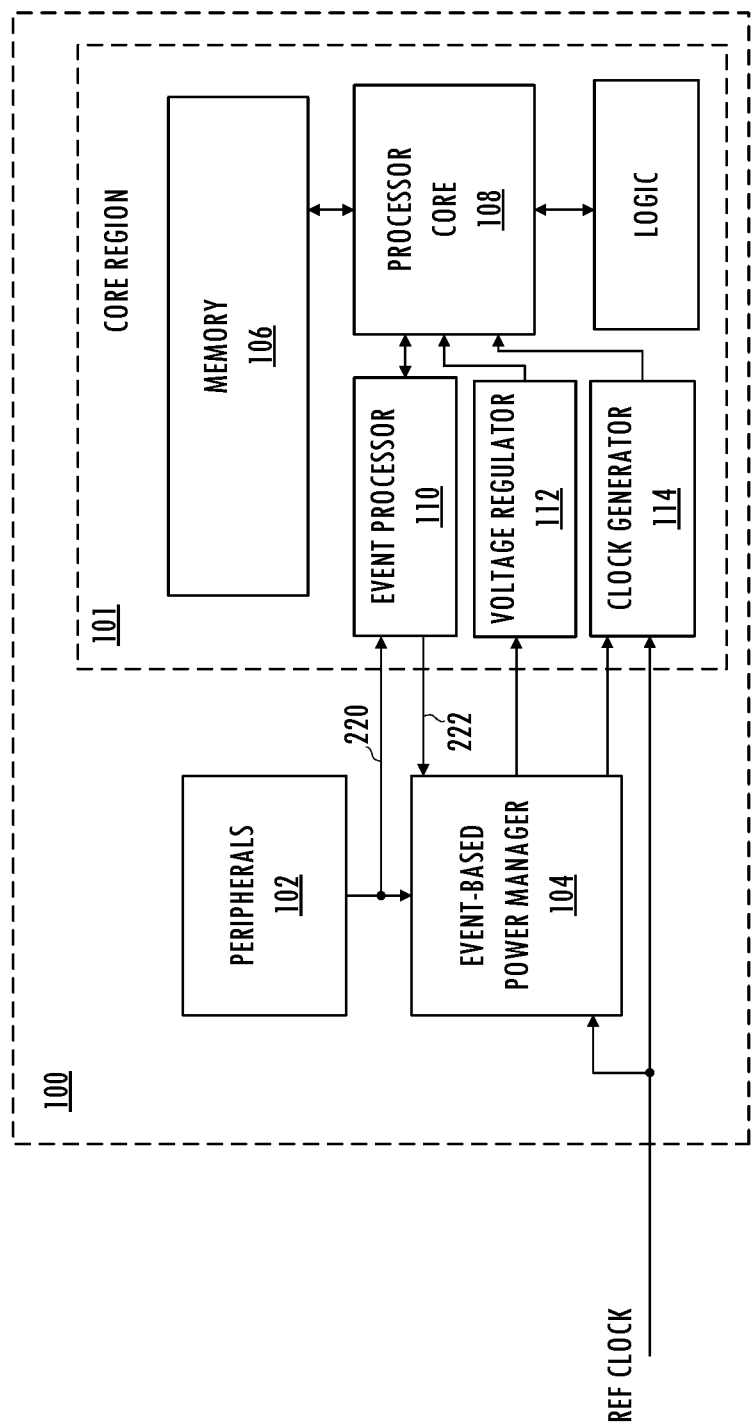
FIG. 1 illustrates a functional block diagram of an embedded processing system including an event-based power manager consistent with at least one embodiment of the invention.

Referring to FIG. 1, embedded processing system 100 includes event-based power manager 104, which enables an adaptive power management policy responsive to a workload of processor core 108. Event-based power manager 104 is transparent to the programmer-user, i.e., the programmer-user need not be aware of the event-based power manager. As referred to herein, a workload is a set of tasks that execute on processor core 108. A workload model is a description of the workload and includes characteristics of each task, e.g., execution time (in number of clock cycles), deadline, and period (if task is periodic). Embedded processing system 100 implements an event-driven programming model. That is, embedded processing system 100 has a set of tasks that are coded within event-handler routines and executed by processor core 108 in response to event processor 110. Event processor 110 controls the program execution flow of processor core 108, i.e. the event processor 110 triggers execution of event-handler routines on processor core 108. Event processor 110 triggers events based on one or more control signals (e.g., one or more interrupt signals) received from peripherals 102, and delivers interrupts to processor core 108 that cause processor core 108 to execute the corresponding event-handler routines (e.g., callback subroutines). A software routine included within an event-handler corresponds to an individual task of the workload. Event processor 110 controls execution of the software routines included in the event-handlers, even supporting preemption with a priority level system. For example, event processor 110 may be a nested vectored interrupt controller (NVIC), which is an ARM® CORTEX®-M core event-unit. The exemplary event processor 110 facilitates exception and interrupt handling including enabling interrupts, implementing interrupt priorities, setting and resetting of pending states of interrupts, and providing addresses of event handlers.

To make event-based power manager 104 transparent to the programmer-user, event-based power manager 104 relies on a workload model inferred at runtime, i.e., derived by event-based power manager 104 from monitoring processor core events (e.g., asynchronous external activity). Unlike conventional systems, a programmer-user does not provide the workload model information to the system and event-based power manager 104 does not require any interaction or support from a task manager software module, as is required by operating system-based inter-task power management techniques. Event-based power manager 104 infers the workload model by monitoring the status of event processor 110 and using timestamps and/or counts of timer clock cycles associated with the status.

To overcome shortcomings of conventional task-agnostic power management techniques described above, event-based power manager 104 attempts to synchronize the power management operations with the workload by observing interrupt activity and service actions of the event processor 110. Embedded processing system 100 invokes event-based power manager 104 in response to a trigger received from event processor 110, which is triggered by a processor-event or in response to a transition of program execution of processor core 108 from a current task (e.g., event handler routine) to execution of another task (e.g., another event-handler routine). Consequently, the power management actuation rate is adaptive with respect to workload timing, in contrast to time-sliced approaches for which the controller is invoked periodically and is completely asynchronous from the workload timing. Event-based power manager 104 selects an operating point synchronously with the task period, improving efficiency of power management.

Event-based power manager 104 performs workload predictions based on per-task information that is inferred at runtime. Accordingly, event-based power manager 104 detects any workload changes due to asynchronous and aperiodic events and handles those asynchronous and aperiodic events synchronously with the workload change. In addition, event-based power manager 104 detects changes to data-driven execution time and promptly adjusts the current operating point accordingly. Unlike the time-sliced techniques described above, event-based power manager 104, which uses an inferred workload model, can apply workload-aware actions to efficiently handle workload variations. If processor core 108 executes a periodic task with a changing execution time, the periodic event activates event-based power manager 104 with the same rate as processor core 108, providing a more fine-tuned control strategy as compared to a time-sliced power management approach discussed above. Furthermore, event-based power manager 104 selects an operating point by considering the inferred task and a predetermined energy model for the device. For example, event-based power manager 104 selects an operating point associated with a lowest energy consumption, as defined by the predetermined energy model that is not expected to degrade performance.

Event-based power manager 104 is integrated within embedded processing system 100 that is and, if enabled, event-based power manager 104 selects and controls the clock frequency and the supply voltage of processor core 108 according to the workload of processor core 108. Processor core 108 features a discrete set of operating points, each defined by a supply voltage and a corresponding clock frequency. The workload is the set of tasks that are executed by processor core 108. Event-based power manager 104 infers a complete workload model by considering features of each task, e.g., arrival time, task period (if periodic), task deadline, and the task execution time, in terms of number of clock cycles. In at least one embodiment, the task deadline is the task period (i.e. an implicit deadline). Event-based power manager 104 estimates the task execution time by counting a number of timer clock cycles elapsed between task issue time and task completion. Event-based power manager 104 estimates the task deadline as the task period (i.e. the implicit deadline). In addition, event-based power manager 104 may select a sleep state in response to processor core 108 transitioning to an idle state (e.g., a state in which processor core 108 waits for an interrupt or polls for next event).

At runtime, event-based power manager 104 builds the workload model by observing the status of the event processor 110. For example, event-based power manager 104 observes one or more of events triggered, events pending, and actual event-handler execution, as indicated by event-unit status signal 222. Event processor 110 stores information related to execution flow of processor core 108. Whenever an interrupt is triggered, processor core 108 stores a current processor state in hardware upon interrupt entry and processor core 108 is restored to that stored processor state upon interrupt exit. Event processor 110 includes a set of registers that indicate if an interrupt is currently being served, and/or an interrupt is currently pending (e.g., interrupt set-pending register, interrupt clear-pending register, or interrupt active bit register of an ARM® CORTEX®-M NVIC controller). Event-based power manager 104 will capture any changes to the state of the register bits as indicated by a change to status signal 222 and used to infer the workload model. Prior knowledge from the programmer, e.g., knowledge of compiler code annotation or additional information, is not required. Event-based power manager 104 infers the current processor workload model by monitoring the activity of event processor 110 associated with processor core 108. A state change of event-processor 110 as indicated by event-unit status signal 222 invokes event-based power manager 104. This implements an event-driven execution of a power management policy, which is in contrast with any time-triggered power management policy.

The inferred workload model classifies each executing task as periodic or aperiodic (i.e., sporadic). In at least one embodiment, once event processor 110 issues a task, event-based power manager 104 classifies the task as aperiodic, as a default state. Once event processor 110 issues the task periodically, event-based power manager 104 updates the classification to periodic and estimates the period, e.g., as a clock count of the time between two consecutive issuances of the task. For periodic tasks, event-based power manager 104 determines the deadline as the measured period. If the measured period differs from a value stored in the model by more than a specified threshold, event-based power manager 104 updates the task classification to aperiodic. The power management policy implemented by event-based power manager 104 considers any aperiodic task as critical and event-based power manager 104 takes appropriate action after the detection. An exemplary event-based power manager 104 infers the execution time of any task by counting the number of clock cycles elapsed for executing the associated event-handler routine.

Figure 2:
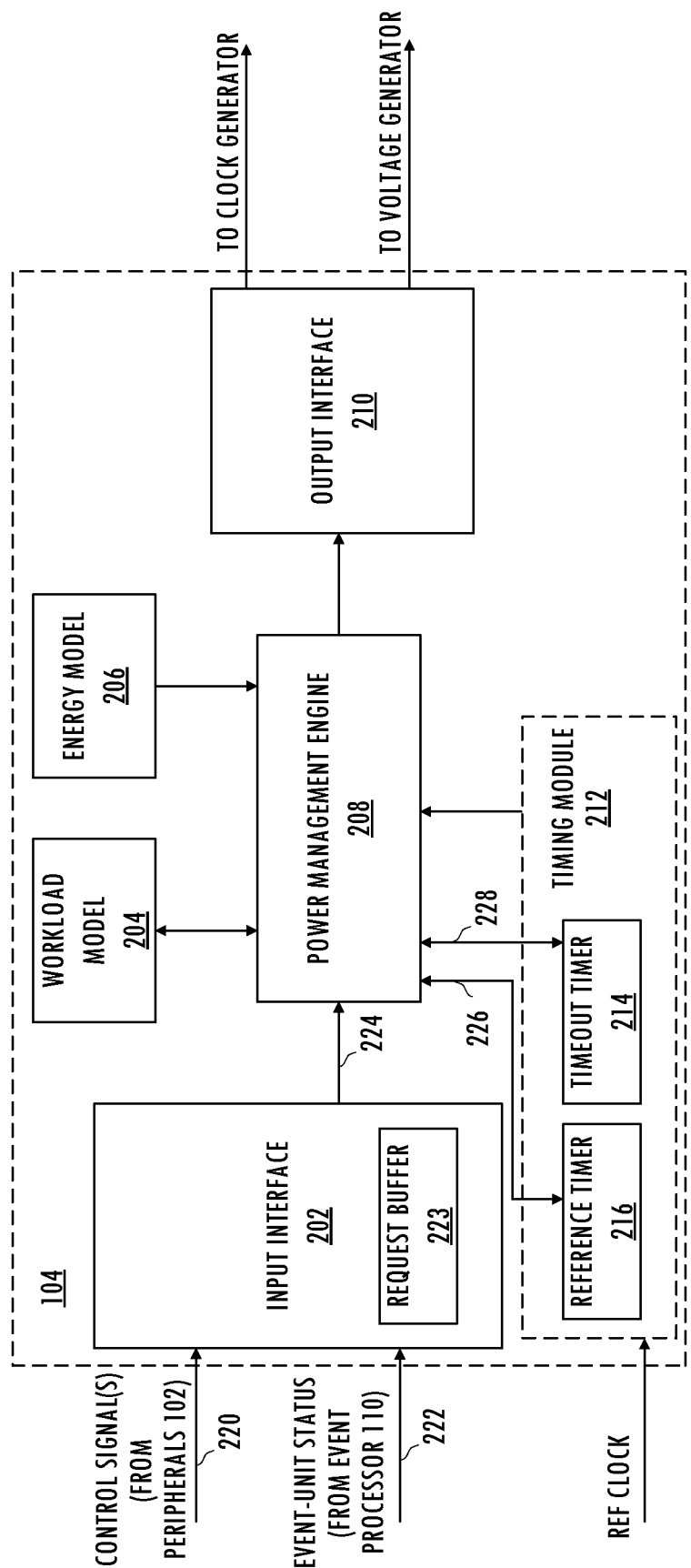
FIG. 2 illustrates a functional block diagram of an event-based power manager consistent with at least one embodiment of the invention.
Figure 3:
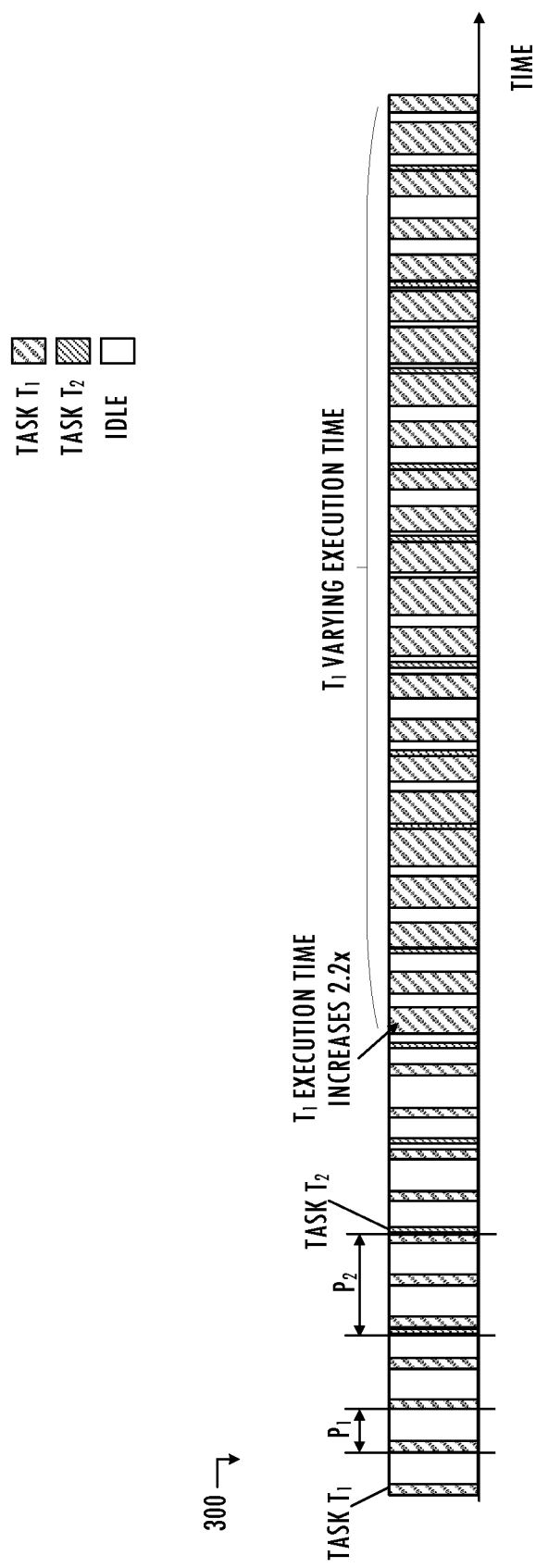
FIG. 3 illustrates an exemplary workload as a function of time for the embedded processing system of FIG. 1.
Figure 4:
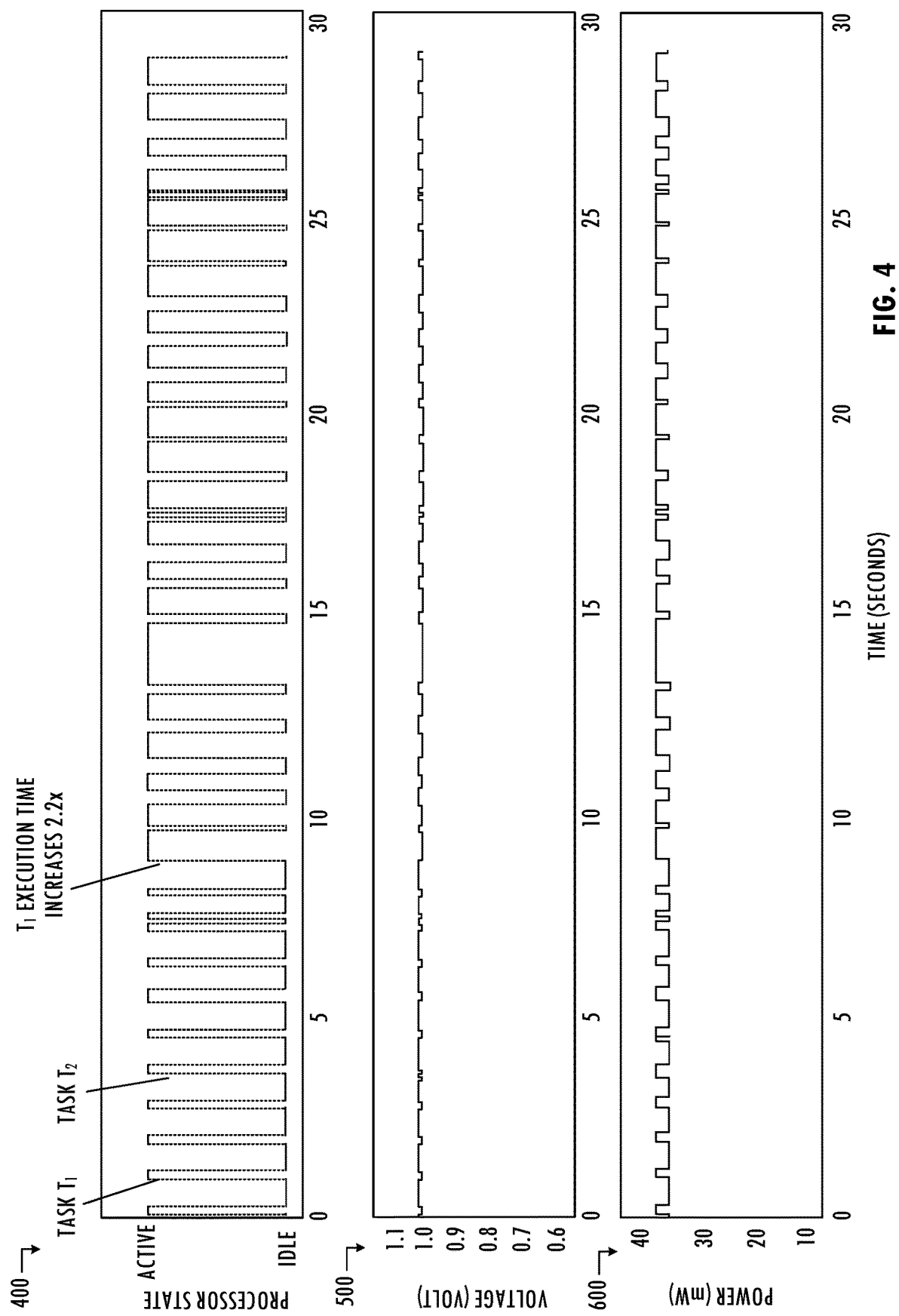
FIG. 4 illustrates exemplary processor events and corresponding power configuration as a function of time for the embedded processing system of FIG. 1.

Referring to FIGS. 1 and 2, event-based power manager 104 includes workload model 204, energy model 206, and power management engine 208. Workload model 204 is inferred at runtime and stored locally in memory. Energy model 206 includes a finite set of operating points of processor core 108. Each of the operating points is defined by a power supply voltage level and a corresponding clock frequency, which may be inferred from process, voltage, and temperature conditions. Power management engine 208 executes the power management policy by selecting a configuration for a target operating point (e.g., a maximum performance operating point or other active operating point or sleep state) to be sent to clock generator 114 and voltage regulator 112, respectively.

In at least one embodiment, event-based power manager 104 executes a power management policy according to state-changes of event processor 110, as indicated by one or more event-unit status signals. Event-based power manager 104 uses the inferred workload model and the stored energy model to select a next operating point. When a task is going to be executed, as indicated by event-unit status signal 222, event-based power manager 104 calculates the available time by considering the estimation of the upcoming time or arrival of a task and task execution times. Event-based power manager 104 limits the energy consumption for an execution of the task in the available interval slot by accounting for the task deadline. Event-based power manager 104 also may use one or more margin values during the selection process to prevent incorrect predictions.

Event-based power manager 104 is closely coupled to voltage regulator 112 and clock generator 114 of core region 101 of embedded processing system 100. Core region 101 supports multiple operating points, each of those operating points being defined by a supply voltage, back-bias voltage, and a corresponding maximum frequency. Event-based power manager 104 may be implemented using a co-processor located outside of core region 101. When enabled, event-based power manager 104 dynamically configures voltage regulator 112 to provide target power supply and body bias voltages and configures clock generator 114 to provide a clock signal having a target frequency according to an operating point selected based on the inferred workload. In at least one embodiment, a reference clock signal, which can be externally or internally generated, drives clock generator 114. In at least one embodiment, processor core 108 enables event-based power manager 104 at runtime, after configuring peripherals 102 for operation and before entering an idle state. Memory 106 stores code that includes instructions that cause processor core 108 to execute tasks using event-handlers, following an event-driven programming model.

At the hardware-level, event-based power manager 104 monitors event activity from the system peripherals using one or more corresponding control signal(s) 220 received from the peripherals and monitors state changes of event processor 110 (e.g. the NVIC module for the ARM® CORTEX®-M cores) of core region 101. Event-based power manager 104 includes input interface 202 that enables power management engine 208 in response to detecting a state change of event-unit status signal 222 or in response to detecting a peripheral event indicated by control signal 220. Input interface 202 provides a custom interface between power management engine 208 and the outer system architecture. For example, input interface 202 triggers enable signal 224 in response to assertion of control signal 220, event-unit status signal 222 indicating that event processor 110 interrupts program execution of processor core 108 to execute a higher-priority event-handler, event-unit status signal 222 indicating that event processor 110 has completed execution of a routine within an event-handler, or event-unit status signal 222 indicating that processor core 108 requests a transition to idle mode. Embodiments of input interface 202 may include request buffer 223 that preserves multiple overlapped events, e.g., by queueing values of event-unit status signal 222.

Event-based power manager 104 includes timing module 212, which includes at least one timer driven by a reference clock. For example, reference timer 216 provides reference clock signal 226 used by power management engine 208 to count and estimate properties of the executing workload. Timeout timer 214 can enable power management engine 208 using timeout signal 228, which is asserted in response to expiration of a timeout count.

Event-based power manager 104 includes energy model 206, which is memory-based storage configured to store operating points (e.g., a finite set of supply and body-bias voltage values and the corresponding maximum clock frequency) of embedded processing system 100. In addition, energy model 206 may store values for active state power consumption for each referenced operating point along with values for available sleep states of core region 101. Event-based power manager 104 includes workload model 204, which is memory-based storage configured to store the inferred workload model. Power management engine 208 updates workload model 204 and exploits workload model 204 at runtime to select the proper operating point of the processor core 108 according to energy model 206.

Event-based power manager 104 includes power management engine 208, which is configured to infer workload model 204 and apply the power management policy based on workload model 204 and energy model 206. Input interface 202 asserts at least one enable signal 224, which invokes power management engine 208 to update or exploit workload model 204 in response to events. In addition, an expiration of timeout timer 214 asserts timeout signal 228, which invokes power management engine 208. Power management engine 208 controls transitions between different operating points of energy model 206 or to a proper sleep state in response to a request for transition to the idle state. Event-based power manager 104 includes output interface 210, to adapt power management engine 208 commands to a communication protocol required by voltage regulator 112 and clock generator 114.

In contrast with time-sliced control techniques discussed above, events invoke event-based power manager 104, which implements associated operations of the power management policy. For example, an exemplary power management policy is intended for workloads composed of non-preemptive tasks (i.e., the power management policy does not initiate a switch from one running task to another task) and may implement a predetermined power performance target (e.g., minimize power consumption on an estimated next interval, achieve a predetermined average power consumption, or other target power consumption specification). In an exemplary embodiment, workload model 204 stores the following information for each task:

arrival time, sampled count value of reference timer 216 when a corresponding event is asserted;
period time, in number of cycles of reference timer 216; inferred from difference between arrival time and a previous arrival time of the task;
next issue time, predicted count value of reference timer 216; predicted based on the arrival time and the period time;
next task, in number of clock cycles of clock generator 114 required by an associated event handler to complete its execution; independent of clock frequency; and
task status, to distinguish between periodic and aperiodic tasks.

Event-based power manager 104 upgrades task status from aperiodic to periodic in response to detecting a repeated occurrence of the task. Table 1 describes an exemplary power management policy.

TABLE 1

Power Management Policy

| EVENT | DESCRIPTION | ACTIONS |
|---|---|---|
| processor-event asserted | task creation | update period time and task status enter boost state if task status is aperiodic processor-event is in a pending state |
| event-handler going to be executed | task running | estimate next available interval (next interval) based on next task arrival time load timeout timer for expiration in response to the current workload exceeding the MARGIN prediction select operating point based on workload model and predetermined power performance target |
| event-handler completes execution | task completion | compute and store the last measured workload exit from boost state if last critical task completes |
| timeout timer expires | | enter boost state |
| system transition to idle state | no tasks in running or queued | select sleep state based on estimation of next task arrival time |

To address aperiodic tasks (which may be latency-critical), abrupt workload variations, and overlapping arriving events, event-based power manager 104 uses a boost state. The boost state enables a maximum-performance operating point. In response to detecting an aperiodic task, an abrupt workload variation, or overlapping arriving events, event-based power manager 104 categorizes the task as critical. In response to completion of the last critical task, event-based power manager 104 transitions from the boost state to another active state operating point or a sleep state. Event-based power manager 104 considers additional rules to counteract workload variations. For example, event-based power manager 104 increases a predicted task execution time by MARGIN, i.e., a predetermined count parameter that addresses small workload under-estimation. Another rule that event-based power manager 104 may implement includes selecting a target frequency for an upcoming task that limits execution time of the task to span less than the entire available next time slot (expressed in terms of a percentage TARGET_WORKLOAD).

Referring to FIGS. 1-4, graph 300 illustrates execution of tasks as a function time for an exemplary application of the power management policy by event-based power manager 104 in response to the processor core 108 executing two periodic tasks with different periods and phases and the same priority level. The hatched sections represent task execution time, i.e., time that processor core 108 is actively executing a task, and unhatched sections represent idle time, i.e., time that processor core 108 is not executing a task. In this example, the operating point of processor core 108 is limited to the highest performance. Initially, task $T_1$ has a constant execution time and a period of $P_1$. Task $T_2$ has a constant execution time, less than execution time of task $T_1$, and a period of $P_2$. The execution time of task $T_1$ begins to vary after some occurrences. Graphs 400, 500, and 600 illustrate the corresponding processor state, voltage, and power consumption as a function of time. The embodiment of processor core 108 features an active state and an idle state. The exemplary highest-performance operating point of processor core 108 is a power supply voltage of 1.05 V and a running clock frequency of 520 MHz. Graph 400 illustrates the state of processor core 108 during the test time and graphs 500 and 600 illustrate the corresponding (fixed) supply voltage (in Volts) and power consumption (in milli-Watts), respectively.

Figure 5:
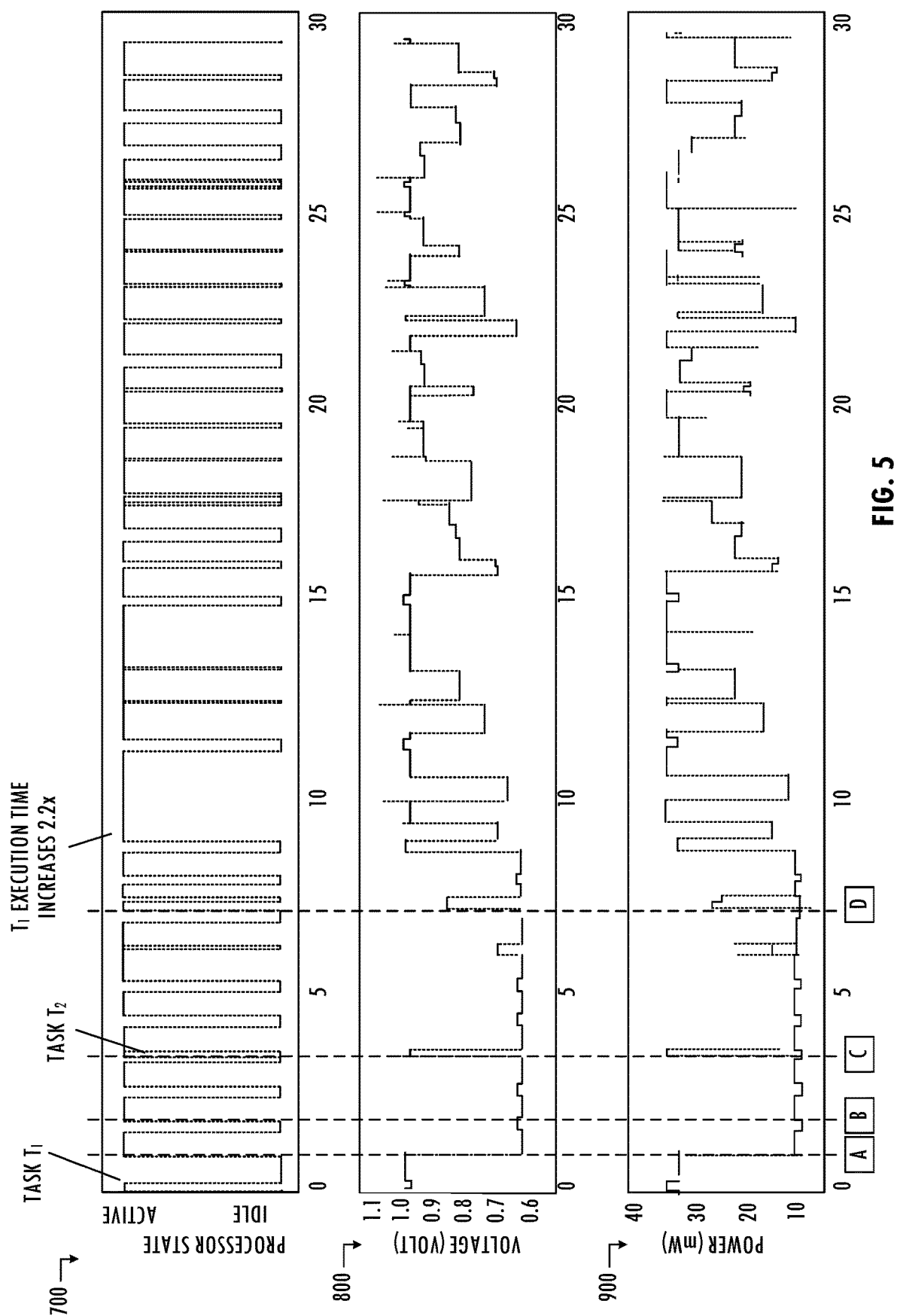
FIG. 5 illustrates exemplary processor events and corresponding power configuration as a function of time for the embedded processing system of FIG. 1.

FIG. 5 illustrates the voltage and power measurement after enabling event-based power manager 104 configured with exemplary operating points within the range of approximately 0.6 V to approximately 1.05 V. The resulting average power consumption is 37% lower than the baseline of FIG. 4. At time 0, event-based power manager 104 has no prior knowledge of workload of embedded processing system 100. At time 0, processor core 108 issues task $T_1$, which event-based power-manager 104 initially considers as aperiodic. Accordingly, event-based power manager 104 selects the boost state and the highest-performance operating point. At time index A, an event triggers task $T_1$ again and event-based power manager 104 upgrades task $T_1$ to periodic. Event-based power manager 104 predicts task $T_1$ to span over a finite time, which is also the implicit deadline as denoted by time index B. Based on that prediction, event-based power manager 104 selects the next operating point such that the active state (i.e., the task execution time) is at most, a predetermined time of the predicted slot. That predetermined time may be expressed by a percentage of TARGET_WORKLOAD.

While embedded processing system 100 is in the idle state, at time index C, event-based power manager 104 detects an event that initially triggers task $T_2$. Accordingly, event-based power manager 104 selects the boost state. Subsequent events trigger task $T_2$ again and event-based power manager 104 upgrades task $T_2$ to periodic and event-based power manager 104 selects a lower energy operating point. At time index D, task $T_1$ is about to run again. Although the execution time has not changed since the last occurrence, the available time slot is less than the task period due to the upcoming task $T_2$. The inferred workload model indicates this condition and event-based power manager 104 selects a higher-performance operating point to prevent performance degradation.

Event-based power manager 104 may be useful to improve energy usage of embedded processing system 100 in Internet of Things (IoT) applications, e.g., health-monitoring wearable devices used for sensing and communicating human body parameters (e.g. heart rate, blood pressure), either during sport activities or for medical purposes. Other applications include multimedia consumer devices for voice recognition, image smart labelling and video detection for smart surveillance systems. In such exemplary applications, peripherals 102 include an application-specific set of sensors and a wireless transmission sub-system configured to stream sensed information. To extend the system battery life, processor core 108 is configured in idle mode and is periodically activated (e.g., by using a peripheral timer as event source) to sample data from the sensor and execute data processing algorithms coded in a corresponding event-handler. Event-based power manager 104 selects an operating point based on inferred workload model and predetermined power performance target without programmer-user coding and without extensive knowledge of the underlying hardware resources. For example, in an exemplary heart-rate measurement application or voice-recognition system, the processing core periodically analyzes an array of data collected from an external sensor, in peripherals 102 and enables a wireless transmitter in peripherals 102 to transmit computed parameters to an external device using a low power, low bandwidth communication. Event-based power manager 104 automatically selects the performance level of processor core 108 to lower the power consumption without degrading the system performance.

Since event-based power manager tracks temporal characteristics of each task, the execution of a periodic task with a fixed workload and coded to conform the event-driven programming model causes the power supply level (e.g., voltage level) and power consumption to synchronously track transitions between different operating points and the occurrence of tasks. This behavior is different from a system implementing conventional time-sliced power management techniques that drive actions asynchronously with respect to task timing. Thus, a system including event-based power manager 104 has task execution that is synchronous with power supply level changes.

In at least one embodiment, a method for managing power in an embedded processing system includes generating a workload model for the embedded processing system in response to a control signal, an event status signal, and a reference clock signal. The control signal is received from a peripheral device. The event status signal is received from an event processor configured to control execution of tasks by a processor core of the embedded processing system. The method includes providing power configuration information to the processor core. The power configuration information corresponds to an operating point selected based on the control signal, the event status signal, the reference clock signal, the workload model, and a predetermined energy model. The workload model may include a periodicity status and an execution time for each task executed by the processor core. The workload model may include a periodicity status, an execution time, an arrival time, a period time, a next issue time, and a next task workload for each task executed by the processor core. Generating the workload model may include creating a task in the workload model in response to detecting an event on the control signal, the task being created with a task periodicity status indicating the task is aperiodic. Generating the workload model may include detecting multiple occurrences of an event using the control signal and updating the workload model in response to the multiple occurrences of the event. The updating may include changing a task periodicity status from aperiodic to periodic in response to detecting the multiple occurrences of the event and determining a task period time and a task next issue time. The method may include selecting a highest-performance operating point as the operating point in response to the event status signal indicating a task is pending and the workload model indicating that the task is aperiodic. The method may include selecting a highest-performance operating point as the operating point for execution of a task in response to an expiration of a timeout timer and detecting the overlapping arriving events. The method may include, in response to the event status signal indicating execution of a task, estimating a next available interval based on a next task arrival time and loading a timeout timer to expire in response to a current workload exceeding a predicted workload by a margin amount of time. The method may include, in response to the event status signal indicating completion of a task, determining a last measured workload, and exiting from a boost state in response to the task being a last critical task. The method may include, in response to expiration of a timeout timer, selecting a boost state as the operating point. The method may include, in response to the event status signal indicating a transition of the embedded processing system to an idle state, selecting a sleep state based on an estimation of a next task arrival time.

In at least one embodiment, an embedded processing system includes a processor core configured to execute an event-driven program responsive to an event status signal, a power supply signal, and a clock control signal. The embedded processing system includes an event processor responsive to a control signal from a peripheral device and configured to control an execution flow of event handling routines by the processor core using the event status signal. The control signal is indicative of an event. The embedded processing system includes a processor power control circuit configured to provide the power supply signal and the clock control signal to the processor core. The processor power control circuit is configured to provide at least one of the power supply signal and the clock control signal in response to selected power configuration information. The embedded processing system includes an event-based power manager configured to generate a workload model for the embedded processing system based on the control signal and the event status signal and configured to provide the selected power configuration information based on the workload model, a predetermined energy model, the control signal, the event status signal, and a reference clock signal. The event-based power manager may include a timer configured to generate a count signal based on the reference clock signal and a timer control signal. The event-based power manager may include a power management processor configured to generate the timer control signal in response to the event status signal and the control signal and configured to generate the workload model based on the event status signal, the control signal, and the count signal. The timer may be further configured to generate a timeout signal in response to the count signal. The power management processor may be invoked in response to the timeout signal. The event-based power manager may include energy model storage configured to store predetermined power configuration information for a plurality of operating points of the embedded processing system and workload model storage configured to store the workload model. The workload model may include a periodicity status and an execution time for each task executed by the processor core. The selected power configuration information may include a clock frequency setting and a voltage setting. The power operating point control circuit may include a voltage regulator configured to adjust a power supply level based on the voltage setting and a clock generator configured to adjust a frequency of an output clock signal based on the clock frequency setting.

In at least one embodiment, a method for managing power in an embedded processing system includes providing power configuration information to a processor core executing an event-driven program. The power configuration information corresponds to a first operating point of the embedded processing system. The method includes detecting an occurrence of an event based on a control signal received from a peripheral device and an event status signal received from an event processor configured to control execution of the event-driven program by the processor core. The method includes updating the power configuration information provided to the processor core. The power configuration information is updated from the first operating point to a second operating point based on a workload model for the embedded processing system and a count value generated by a timer of an event-based power manager. The workload model includes a task execution time and a task periodicity for each task executed by the event-driven program.

Thus, embodiments of an event-based power manager have been described. The event-based power manager is transparent to the user and requires no changes to operating system software or middleware software. A programmer-user need not explicitly provide a description of a workload and its characteristics (e.g., task period, task deadline, task worst-case or best-case execution time). Although the invention is described herein with reference to specific embodiments, various modifications and changes can be made without departing from the scope of the present invention as set forth in the claims below. For example, while the invention has been described in embodiments in which the power management policy handles workloads composed of non-preemptive tasks, one of skill in the art will appreciate that the teachings herein can be implemented for workloads including preemptive tasks. In at least one such embodiment, event-based power manager 104 stops and restarts current execution time count in response to task preemption and restoration of task execution. Event-based power manager 104 also stores additional workload information, e.g., remaining task time, which corresponds to the difference between a predicted execution time and the time elapsed up to the preemption. Thus, event-based power manager 104 computes a suitable target processor frequency when the task is restored. Event-based power manager 104 may select an increased-performance operating point whenever a running task is being preempted by a higher-priority task. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for managing power in an embedded processing system, the method comprising:
generating a workload model for the embedded processing system in response to a control signal, an event status signal, and a reference clock signal, the control signal being received from a peripheral device, and the event status signal being received from an event processor configured to control execution of tasks by a processor core of the embedded processing system in response to the control signal, the control signal being indicative of an event, and the event status signal being indicative of a state of the event processor;
providing power configuration information for the processor core, the power configuration information corresponding to an operating point selected based on the control signal, the event status signal, the reference clock signal, the workload model, and a predetermined energy model; and
adjusting a power supply level or a frequency of a clock signal provided to the processor core based on the power configuration information.

2. The method, as recited in claim 1, wherein the workload model includes a periodicity status and an execution time for each task executed by the processor core.

3. The method, as recited in claim 1, wherein the workload model includes a periodicity status, an execution time, an arrival time, a period time, a next issue time, and a next task workload for each task executed by the processor core.

4. The method, as recited in claim 1, wherein generating the workload model comprises:
creating a task in response to detecting an event on the control signal, the task being created with a task periodicity status indicating the task is aperiodic.

5. The method, as recited in claim 4, wherein generating the workload model comprises:
detecting multiple occurrences of the event using the control signal; and
updating the workload model in response to the multiple occurrences of the event.

6. The method, as recited in claim 5, wherein the updating comprises:
changing the task periodicity status from aperiodic to periodic in response to detecting the multiple occurrences of the event; and
determining a task period time and a task next issue time.

7. The method, as recited in claim 1, further comprising:
selecting a highest-performance operating point as the operating point in response to the event status signal indicating a task is pending and the workload model indicating that the task is aperiodic.

8. The method, as recited in claim 1, further comprising:
selecting a highest-performance operating point as the operating point for execution of a task in response to an expiration of a timeout timer and detecting overlapping arriving events.

9. The method, as recited in claim 1, further comprising:
in response to the event status signal indicating execution of a task:
estimating a next available interval based on a next task arrival time; and
loading a timeout timer to expire in response to a current workload exceeding a predicted workload by a margin amount of time.

10. The method, as recited in claim 1, further comprising:
in response to the event status signal indicating completion of a task:
determining a last measured workload; and
exiting from a boost state in response to the task being a last critical task.

11. The method, as recited in claim 1, further comprising:
in response to expiration of a timeout timer, selecting a boost state as the operating point.

12. The method, as recited in claim 1, further comprising:
in response to the event status signal indicating a transition of the embedded processing system to an idle state, selecting a sleep state based on an estimation of a next task arrival time.

13. An embedded processing system comprising:
a processor core configured to execute an event-driven program responsive to an event status signal, a power supply signal, and a clock control signal;
an event processor configured to control an execution flow of event handling routines by the processor core using the event status signal in response to a control signal from a peripheral device, the control signal being indicative of an event, the event status signal being indicative of a state of the event processor;
a processor power control circuit configured to provide the power supply signal and the clock control signal to the processor core, the processor power control circuit being configured to provide the power supply signal or the clock control signal in response to a selected power configuration information; and
an event-based power manager configured to generate a workload model for the embedded processing system based on the control signal and the event status signal and configured to provide the selected power configuration information based on the workload model, a predetermined energy model, the control signal, the event status signal, and a reference clock signal.

14. The embedded processing system, as recited in claim 13, wherein the event-based power manager comprises:
a timer configured to generate a count signal based on the reference clock signal and a timer control signal; and
a power management processor configured to generate the timer control signal in response to the event status signal and the control signal and configured to generate the workload model based on the event status signal, the control signal, and the count signal.

15. The embedded processing system, as recited in claim 14, wherein the timer is further configured to generate a timeout signal in response to the count signal, the power management processor being invoked in response to the timeout signal.

16. The embedded processing system, as recited in claim 13, wherein the event-based power manager comprises:
energy model storage configured to store predetermined power configuration information for a plurality of operating points of the embedded processing system; and
workload model storage configured to store the workload model.

17. The embedded processing system, as recited in claim 13, wherein the workload model includes a periodicity status and an execution time for each task executed by the processor core.

18. The embedded processing system, as recited in claim 13, wherein the selected power configuration information includes a clock frequency setting and a voltage setting and the processor power control circuit comprises:
a voltage regulator configured to adjust a power supply level based on the voltage setting; and
a clock generator configured to adjust a frequency of an output clock signal based on the clock frequency setting.

19. The embedded processing system, as recited in claim 13, wherein the event-based power manager comprises:
a storage element; and
a processor configured to execute instructions stored in the storage element, the instructions being executable by the processor to cause the processor to generate the workload model based on the control signal and the event status signal and configured to provide the selected power configuration information based on the workload model, the predetermined energy model, the control signal, and the event status signal.

20. A method for managing power in an embedded processing system, the method comprising:
providing power configuration information for a processor core executing an event-driven program, the power configuration information corresponding to a first operating point of the embedded processing system;
detecting an occurrence of an event based on a control signal received from a peripheral device and an event status signal received from an event processor configured to control execution of the event-driven program by the processor core, the event status signal being indicative of a state of the event processor;
updating the power configuration information for the processor core, the power configuration information being updated from the first operating point to a second operating point based on a workload model for the embedded processing system and a count value generated by a timer of an event-based power manager, the workload model including a task execution time and a task periodicity for each task executed by the event-driven program; and adjusting a power supply level or a frequency of a clock signal provided to the processor core based on the updated power configuration information.

* * * * *